Patented Aug. 14, 1945

2,381,935

UNITED STATES PATENT OFFICE 2,381,935

PROCESS FOR PRODUCING MORPHOLINE COMPOUNDS

William H. Strain and Joseph B. Dickey, Rochester, N. Y., assignors to Eastman Kodak Company, Rochester, N. Y., a corporation of New Jersey No Drawing. Application November 16, 1940, Serial No. 365,988

6 Claims. (Cl. 260—241)

This invention relates to the production of morpholine compounds and particularly those morpholine compounds which contain an aromatic ring in addition to or in conjunction with a morpholine ring.

The morpholine compounds are known industrially and are used, for example, as dye intermediates. Such a use of certain morpholine compounds is described in McNally and Dickey co-pending application, Serial No. 309,688, now Patent No. 2,251,947. We have also found that certain of the morpholine compounds producible in accordance with this invention may not only be used as intermediates in dye manufacture, but are useful as photographic developers, antioxidants, gum inhibitors, and the like. Certain of the compounds, as will be discussed hereinafter, we have found are useful in the preparation of colored photographic images.

Prior to our invention of the new method described herein, methods for manufacturing morpholine compounds which had been suggested in the art were in many instances suitable for a laboratory-scale operation and when demands were made to adapt the processes to large-scale operation, disadvantages were encountered. For example, methods of preparing morpholine are discussed in Berichte der deutschen chemischen Gesellschaft. However, these methods involve the utilization of substantial quantities of concentrated hydrochloric acid. Not only are certain of these methods slow for the preparation of morpholine compounds, but they are extremely objectionable from the large-scale commercial operation standpoint because of the corrosive nature of concentrated hydrochloric acid. The use of such material necessitates employment of special corrosion-resistant equipment and otherwise entails difficulties. It is, therefore, apparent that the development of a novel method which avoids certain of the disadvantages encountered heretofore, and at the same time permits the production of a satisfactory grade of morpholine compounds in good yields, is a highly desirable result.

After extensive investigation we have found a new method for the manufacture of morpholine compounds whereby morpholine compounds may be produced which are useful as dye intermediates, antioxidants, and in color photography, which method is suitable for commercial utilization and permits the production of satisfactory compounds in a simple and convenient manner.

This invention has for one object to provide a new method for the manufacture of morpholine compounds and particularly those morpholine compounds containing an aromatic nucleus in addition to, or in conjunction with, the morpholine nucleus. Another object is to provide a method for the manufacture of morpholine compounds which method avoids some of the disadvantages of the prior art. Another object is to provide a new method for manufacturing morpholine compounds which does not require unduly corrosive materials in its operation. Still another object is to provide a new method for the manufacture of morpholine compounds which method is relatively simple and convenient, gives good yields, and is adaptable to commercial utilization.

Still another object is to provide a process for the manufacture of morpholine compounds which may be used as dye intermediates, antioxidants, and in color photography.

Still another object is to provide a process particularly suitable for the manufacture of compounds having the formula:

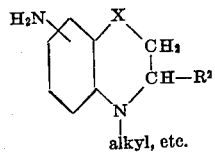

alkyl, etc.

Other objects will appear hereinafter.

We have found new methods for preparing morpholine compounds having the formula:

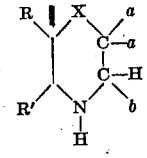

where $a$ and $b$ are hydrogen or a substituted or unsubstituted alkyl, heterocyclic, cycloalkyl, or aryl group; X is oxygen or sulfur, and R and R' together form an aromatic ring system.

We have found that compounds of this type can be prepared by hydrogenating a compound having the formula:

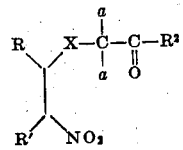

where R, R' and $a$ have the meaning given above and $R^2$ has the same value as $a$; over a metal catalyst. These reactions may be carried out at temperatures ranging between 25° and 225° or more, and at pressures ranging between two and several hundred atmospheres.

While we do not wish to be bound by any theory respecting the exact mechanism of any reactions occurring in our process, as an aid to a better understanding of the process it is suggested that the reaction is probably expressed by one or some combination of the following:

I

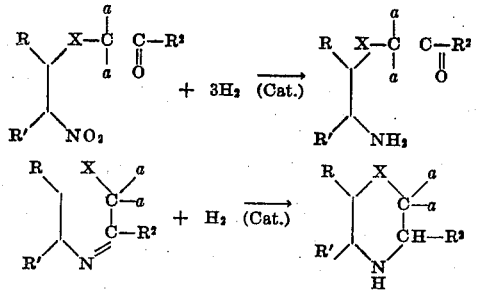

II

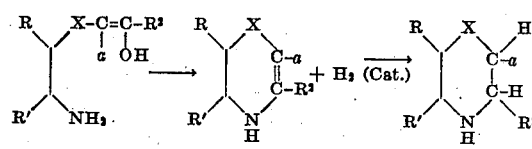

III

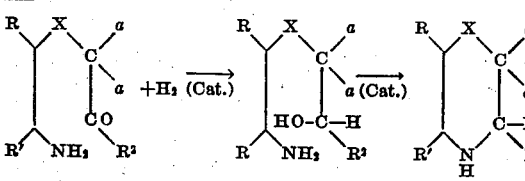

Among the catalysts we may use we wish to mention nickel on kieselguhr, "Raney" nickel, copper, copper chromium oxide, zinc copper chromium oxides, molybdenum, iron cobalt, platinum, titanium and the like.

The products of this invention are valuable intermediates for the preparation of azo and indophenol dyes, photographic developers, antioxidants, gum inhibitors and the like. Compounds having the formula:

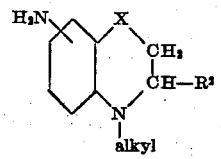

are useful for the preparation of colored photographic images.

A more complete understanding of our invention may be had from reference to the following specific examples which are set forth primarily for illustrating our preferred embodiments of the invention and are not to be considered as undue limitations upon our invention.

Example 1

195 gm. o-nitrophenoxyacetone, 150 cc. methanol and 10 gm. of "Raney" nickel catalyst are charged into a shaking autoclave and raised to a temperature of 125–170° under a pressure of 150 atmospheres of hydrogen. When no more hydrogen is absorbed (about 4 moles) the bomb is cooled and its contents are removed and fractionated under reduced pressure. There is obtained a 70% yield of 3-methylbenzomorpholine boiling at 165°/16 mm.

Example 2

211 gm. o-nitrophenyl-β-ketopropylsulfide are hydrogenated at 100° over 15 gm. nickel on kieselguhr until no more hydrogen is taken up (about 4 moles). There is obtained a good yield of

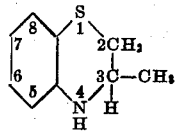

boiling at 170°/16 mm.

Example 3

225 gm. 2-nitro-5-methylphenoxyacetone are hydrogenated at 100 atmospheres pressure over 15 gm. copper chromium oxide at 75–90° for 2 hours and then raised to 225° for 1 hour. The reaction products on distillation give a 75% yield of 3,7-dimethylbenzomorpholine boiling at 110°/2 mm.

Example 4

195 gm. 2-nitro-6-methylphenoxyacetaldehyde are reduced at room temperature over platinum oxide containing some ferrous sulfate. After one hour the temperature is raised to 180–200°. When the theoretical amount of hydrogen has been taken up, shaking is stopped and the reaction allowed to cool. On distillation there is obtained a good yield of

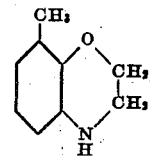

boiling at 165–168°/15 mm.

Example 5

272 gm.

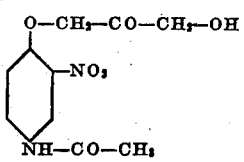

are hydrogenated over 25 gm. molybdenum sulfide at 200°–225°. There is obtained a good yield of

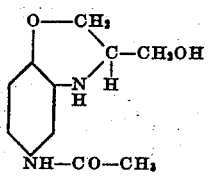

This product is dissolved in alcohol, treated with charcoal and filtered.

Example 6

One mole of

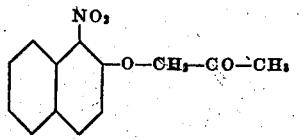

is treated over 20 gm. nickel from a nickel-aluminum and/or silicon alloy as in Example 1. There is obtained a good yield of

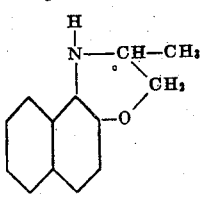

Using the methods described in Examples 1-6, the following compounds have been prepared:

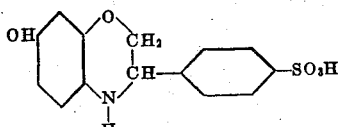

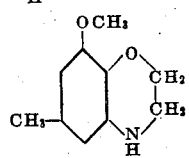

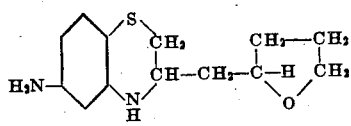

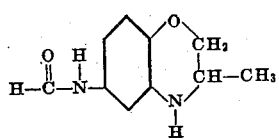

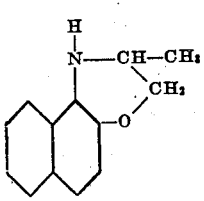

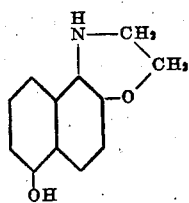

etc.

It may be seen from the foregoing examples that good yields of various morpholine compounds may be obtained by our new process. The methods described herein are particularly useful for producing compounds which may be employed in the preparation of colored photographic images; namely, compounds having an amino aromatic nucleus in addition to, or in conjunction with, a morpholine nucleus. These compounds may be employed in, for example, a manner similar to that described in U. S. Patent 2,196,739.

As already pointed out, various hydrogenation catalysts may be used in the operation of our process. It is preferred to employ metal and/or metal oxides such as nickel, copper oxide with zinc and chromium oxide and the like. Pressures up to several thousand pounds per square inch may be employed. For increase in speed of reaction higher pressure and, also, high temperatures may be employed, but such features would necessitate the utilization of specially constructed equipment and since our novel process proceeds satisfactorily at the temperatures specified and in conventional equipment we prefer to use the ranges of temperatures and pressures described in our examples.

The morpholine compounds produced in accordance with our invention may serve as the starting materials for reaction with still further reagents to obtain morpholine compound derivatives which are new compounds. For example, as described in companion Dickey and McNally application, Serial No. 365,989 benzo- and naphthomorpholine may be treated with reagents such as alkylene oxides and chlorohydrins, halogenated acids, acetamides, ethers, ketones, esters, and the like, unsaturated aliphatic acid, nitriles and the like.

However, it is apparent from the foregoing that certain changes may be made in our process; hence we do not wish to be restricted in our invention excepting insofar as is necessitated by the prior art and in any of the appended claims.

We claim:

1. A process for producing a compound having the formula

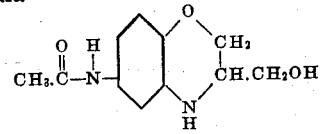

which comprises hydrogenating a compound having the formula:

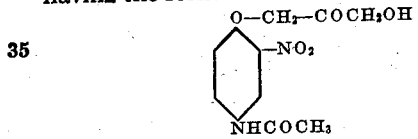

in the presence of a hydrogenation catalyst under elevated temperature and pressure conditions, and during at least a part of the process subjecting the reaction to vigorous shaking.

2. A process for preparing aromatic morpholines and parathiazines which consists of hydrogenating compounds having the general formula:

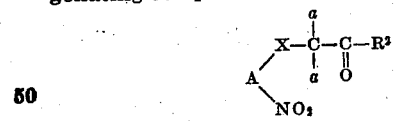

wherein A represents a radical selected from the group consisting of phenylene and naphthylene nuclei, the

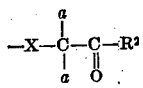

group being attached to the 1-position and the nitro group to the 2-position of the said nuclei, $a$ and $R^2$ represent radicals selected from the group consisting of hydrogen, alkyl, phenyl and tetrahydro-furfuryl, and X represents a radical from the group consisting of oxygen and sulphur, with shaking in the presence of a metal hydrogenation catalyst under elevated temperature and pressure conditions.

3. The process of preparing aromatic morpholines and parathiazines which consists in hydrogenating compounds having the general formula:

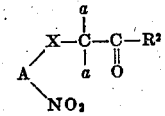

wherein A represents a radical selected from the group consisting of phenylene and naphthylene nuclei, the

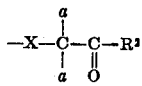

group being attached to the 1-position and the nitro group to the 2-position of the said nuclei, $a$ and $R^2$ represent radicals selected from the group consisting of hydrogen, alkyl, phenyl and tetrahydro-furfuryl, and X represents a radical from the group consisting of oxygen and sulphur, over a nickel catalyst at a temperature ranging from 25–300° C. and under pressures of 2–600 atmospheres, said hydrogenation being carried out at least part of the time with vigorous shaking.

4. The process of preparing aromatic morpholines and parathiazines which consists in hydrogenating compounds having the general formula:

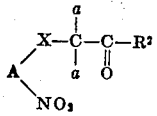

wherein A represents a radical selected from the group consisting of phenylene and naphthylene nuclei, the

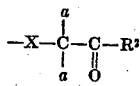

group being attached to the 1-position and the nitro group to the 2-position of the said nuclei, $a$ and $R^2$ represent radicals selected from the group consisting of hydrogen, alkyl, phenyl and tetrahydro-furfuryl, and X represents a radical from the group consisting of oxygen and sulphur, in the presence of a copper and chromium-containing hydrogenating catalyst.

5. In a process for producing benzomorpholines and benzoparathiazines, the step which comprises hydrogenating a compound having the general formula:

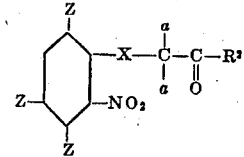

wherein $a$ and $R^2$ represent radicals selected from the group consisting of hydrogen, alkyl, phenyl and tetrahydro-furfuryl, X represents a radical from the group consisting of oxygen and sulphur, and at least one Z represents an acetamino group and any remaining Z represents hydrogen, in the presence of a hydrogenating catalyst at temperatures ranging from 25–300° C. and under pressures of 2–600 atmospheres said hydrogenation being carried out at least part of the time with vigorous agitation.

6. A process which comprises hydrogenating an ortho nitro phenoxy alkanal, the aldehyde group being in the beta position, dissolved in an alcoholic solvent, in the presence of a hydrogenation catalyst with vigorous agitation and under elevated temperatures and pressures.

WILLIAM H. STRAIN.
JOSEPH B. DICKEY.